United States Patent [19]

Benton et al.

[11] 4,021,905

[45] May 10, 1977

[54] METHOD OF STRAIGHTENING FLUE WALLS IN A CARBON ANODE RING FURNACE

[75] Inventors: Charles M. Benton, Hawesville; Paul Cox, Jr., Owensboro, both of Ky.; Paul M. Sprinkle, Tell City, Ind.; Frank John Nowak, Owensboro, Ky.

[73] Assignees: Southwire Company, Carrollton, Ga.; National Steel Corporation, Pittsburgh, Pa.

[22] Filed: Apr. 21, 1976

[21] Appl. No.: 679,041

[52] U.S. Cl. .............................. 29/401 R; 52/514; 202/139; 202/270; 110/1 A; 432/3

[51] Int. Cl.[2] .......................................... B23P 7/00

[58] Field of Search .................... 29/401 R; 52/514; 202/138, 139, 267 R, 268, 270, 239; 110/1 A; 432/3

[56] References Cited

UNITED STATES PATENTS

| | | | |
|---|---|---|---|
| 811,223 | 1/1906 | Houze | 52/514 |
| 2,016,093 | 10/1935 | Knight | 52/514 |
| 2,029,052 | 1/1936 | Bowen | 110/1 A |

FOREIGN PATENTS OR APPLICATIONS

| | | | |
|---|---|---|---|
| 749,170 | 12/1966 | Canada | 72/705 |

OTHER PUBLICATIONS

*Shop Manual For Users of the BlackhawkPorto-Power,* Blackhawk Manufacturing Co., Milwaukee, Wisconsin, 11th Edition, Feb, 1937, pp. 9–15 and p. 22.

*Primary Examiner*—C.W. Lanham
*Assistant Examiner*—Daniel C. Crane
*Attorney, Agent, or Firm*—Van C. Wilks; Herbert M. Hanegan; Stanley L. Tate

[57] ABSTRACT

A method of prolonging the life of a carbon anode ring furnace is disclosed wherein portions of the confronting refractory brick flue walls of the furnace which have partly collapsed can be readily straightened. The refractory bricks of the collapsed portion of a flue wall are urged back into the plane of the wall by interposing a hydraulic jack between the closely spaced flue walls and actuating the jack to apply opposing forces to the wall. The jack is positioned and actuated in a number of locations corresponding to a predetermined circular pattern about a deformation zone to successively reduce the deviation of the bricks of the deformation zone. A tie brick is thereafter inserted between the walls to maintain them in their normal spaced relation.

11 Claims, 6 Drawing Figures

METHOD OF STRAIGHTENING FLUE WALLS IN A CARBON ANODE RING FURNACE

BACKGROUND OF THE INVENTION

This invention relates to prolonging the life of refractory brick walls, and more particularly to a method of straightening collapsed portions of the flue walls of a carbon anode ring furnace.

In the process of aluminum reduction, carbon anodes are used in the reduction process. These carbon anodes are generally formed by compacting a calcined petroleum coke aggregate and a pitch binder into a self-supporting block which is subsequently heat-treated in a large ring furnace. The ring furnace includes a number of flues each comprising a pair of spaced vertical walls constructed of refractory brick formed of silicon carbide or the like. Extending between the confronting surfaces of the walls of the flue are a number of baffles also constructed of refractory brick. These baffles direct the flow of a combustible gas mixture in a predetermined path through the flue. Temperatures as high as 1300° C exist in the hotter areas of the flue, for example, adjacent the upper portion thereof at the point of introduction of the combustible gas mixture. After operation of the furnace for a number of cycles over a period of time at such high temperatures, portions of the flue walls frequently collapse inwardly, particularly in the hot spots adjacent the gas inlets where the walls are generally unsupported by the baffles. Such wall collapses undesirably reduce the cross-sectional area of the gas flow path which, in turn, considerably reduces the efficiency of the furnace. Ultimately, of course, the entire flue walls must be torn down and replaced at considerable expense in terms of both material and labor costs. Moreover, operational efficiency of the aluminum reduction facility as a whole can be impaired by frequent furnace shutdowns for replacement of the collapsed flue walls.

SUMMARY AND OBJECTS OF THE INVENTION

In view of the aforementioned problems in the prior art caused by the localized collapses of the flue walls of the carbon anode ring furnace, it should be apparent that there still exists a need in the art to overcome such problems and extend as much as possible the operational life of the flue walls of the furnace. It is, therefore, a primary object of this invention to provide a novel method of substantially prolonging the operational life of the carbon anode ring furnace.

More particularly, it is an object of this invention to provide a simple and economical method for the in situ straightening of collapsed flue walls of a ring furnace.

Still more particularly, it is an object of this invention to provide a method for urging apart the inwardly collapsed flue walls of a furnace in a controlled manner to avoid damage to the walls.

Another object of this invention is to provide a jacking apparatus which is adapted to be manipulated into position adjacent a collapsed wall portion and operated to selectively urge the displaced refractory bricks back into the plane of the wall.

Briefly described, these and other objects of the invention are accomplished in accordance with its apparatus aspects by providing a fluid actuated jack which is operatively connected by a flexible hose to a fluid pump, such as a manually operated hydraulic pump. An elongated rigid handle is connected to the jack for manipulating the same into a predetermined orientation and position with respect to the collapsed wall portion according to the method of this invention. The oppositely disposed reaction surfaces of the jack which confront the flue walls are of substantially different areas so that the force per unit area applied respectively to the refractory bricks of each confronting flue wall is significantly different. A reaction surface area differential of about 36 sq. in. to 1 sq. in. has been successfully used, but such ratio is not intended to limit the present invention since other area ratios could be utilized as well.

The method aspects of the invention are accomplished by removing the top portion of the furnace to expose the interspace between the flue walls. The jack is then inserted between the walls adjacent a collapsed portion with the larger reaction surface area oriented to confront several bricks of the wall having the lesser deformation, that is, the more planar surface. The smaller reaction surface area of the jack is arranged to confront a single brick of the wall having the greater extent of deformation, preferably at or near the outermost extent of the collapsed wall portion.

Expansion of the jack by means of the manual hydraulic pump urges the displaced brick more into alignment with the plane of the wall and, thereafter, the jack is retracted. By means of the elongated handle, the jack is successively moved into a number of preselected positions about the deformation zone and extended and retracted to reduce the same. In a preferred technique of carrying out the method of the invention, the preselected positions are disposed along substantially circular paths of diminishing radii about the deformation zone in a manner to gradually urge the displaced bricks back into position and to avoid applying such a force to an individual brick that it will be dislodged from the wall and, thus, form a hole therein.

When the wall has been substantially straightened in accordance with the foregoing process, the jack will be located closely adjacent the former point of maximum deviation of the deformation zone, i.e., near the center of the collapsed wall portion. Prior to retracting the jack at this final location, a tie brick is cut to a length closely approximating the distance between the walls and inserted at a point adjacent the jack. Thereafter, the jack is retracted by bleeding the hydraulic cylinder of the pump and the walls will move inwardly to a slight extent and engage the tie brick end faces. The tie brick maintains the walls spaced apart in substantially their original spacing and has no appreciable effect on the flow of combustible gases through the flow path between the flue walls. Advantageously, a high temperature setting mortar is pointed into any cracks or holes in the wall to provide it with added strength and resistance to further collapses.

With these and other objects, advantages and features of the invention that may become hereinafter apparent, the nature of the invention will be more clearly understood by reference to the following detailed description of the invention, the appended claims and to the several views illustrated in the attached drawings wherein:

DETAILED DESCRIPTION OF THE PREFERRED EMBODIMENT

Figure 1:
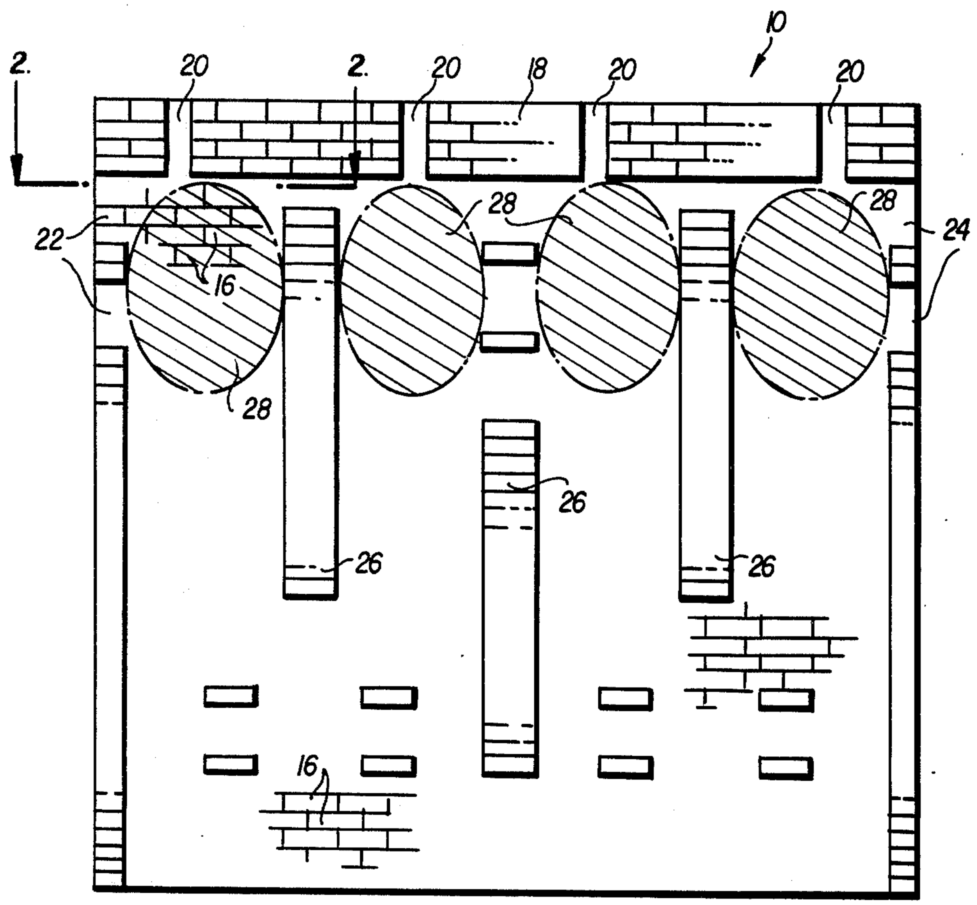
FIG. 1 is a cross-sectional side elevation view of the flue of a carbon anode ring furnace showing the wall areas of greatest susceptibility to collapse.

Referring now to the drawings and more particularly to FIG. 1 wherein there is illustrated in cross-section a flue 10 of a carbon anode ring furnace. The flue 10 comprises a pair of spaced walls 12 and 14 (FIG. 2) constructed of a plurality of refractory bricks 16 composed, for example, of silicon carbide. Such refractory bricks are well-known in the art, one common type particularly suited for constructing the furnace flue walls being designated Type S brick and having a length of nine inches, a width of four and one half inches and a height of three inches. The upper and lower surfaces of the Type S brick are provided with a curvilinear tongue and groove interlocking arrangement, the tongue and groove having a radius of about 9/16 inch and 11/16 inch respectively. The walls 12, 14 may be constructed using the Type S brick in a conventional manner with the grooves arranged on the upwardly facing sides of the bricks of a layer in interlocking relationship with the downwardly facing tongues of a superposed layer of bricks. For purposes of the description herein, the height and length dimensions of a typical flue are approximately 11 feet by 11 feet with a wall spacing of about 6 inches between the confronting wall surfaces.

The top 18 of the flue is enclosed along its entire length except for a number of gas inlet openings 20 through which natural gas or the like is introduced for combustion. To support the combustion of the natural gas, air is drawn into the furnace at an air inlet 22 and the products of combustion are discharged at exhaust outlet 24. The direction of the flow of hot gases between the walls is controlled by a plurality of baffles 26 which direct the gas flow in a generally W-shaped path from inlet 22 to outlet 24 as shown by the arrows in FIG. 1.

The elliptical areas 28 of the flue wall 12 shown in broken lines in FIG. 1 denote the furnace hot spots where temperatures as hot as 1300° C can be reached and where the greatest susceptibility to collapse exists in the flue walls. As is apparent, these areas 28 are situated closely adjacent the upper portion of the flue and coincide generally with the locations of the gas inlet openings 20. It is to be understood, however, that wall collapses or deformation zones could occur in other areas of the flue walls, including the central and lower portions thereof.

Figure 2:
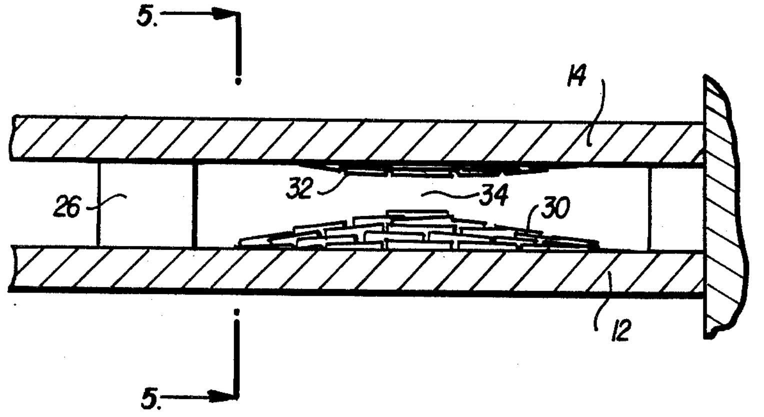
FIG. 2 is a broken cross-sectional view of the furnace flue taken along line 2—2 of FIG. 1 showing portions of the walls which have collapsed inwardly.
Figure 4:
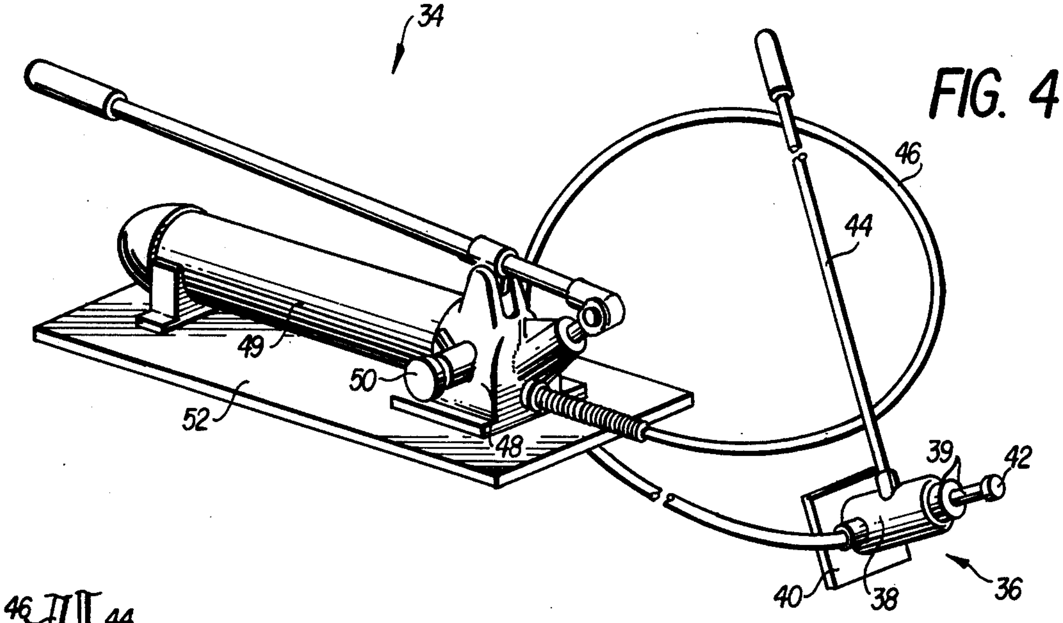
FIG. 4 is a perspective view showing an embodiment of the apparatus of the present invention.

In FIG. 2 there is shown a view looking from the top 18 of the furnace down into interspace between the flue walls 12, 14 where a portion of each of the walls has collapsed inwardly, creating deformation zones 30, 32. Not only do the deformation zones 30, 32 result in a reduced cross-section 34 which restricts the flow of gases through the flue, but they also threaten the integrity of the entire wall and, therefore the operability of the furnace. Thus, it is imperative that the deformation zones be eliminated quickly and economically and with as little damage as possible to the walls themselves. In accordance with the present invention, this is accomplished by use of the apparatus shown in FIG. 4 and designated generally by reference numeral 34.

The apparatus comprises a hydraulic jack 36 having a cylindrical body 38 which houses telescoping pistons 39. At the opposite ends of the jack are disposed reaction surfaces 40, 42 of substantially different cross-section areas and elongated rigid handle 44 is securely affixed to the jack body 38 for manipulating the jack 36 into position between the flue walls. A long flexible hose 46 is operatively connected at one end to the jack for supplying hydraulic fluid under pressure to the jack and the other end of the hose is connected to a hydraulic pump, such as manually operated pump 48. The pump 48 is of conventional construction, therefore, its structure and operation need not be described in great detail except as follows. The hydraulic cylinder 49 of the pump 48 is provided with a bleed valve 50 which may be manually controlled to relieve the pressure developed in the jack 36 to thereby retract the same. Also, the pump may be conveniently mounted, if desired, on a base plate 52 to aid in the handling and use thereof. A jack and pump combination capable of developing a pressure of about 6,000 psi is suitable for use in the present invention. An area ratio of about 36 sq. in. to 1 sq. in. between the reaction surfaces 40, 42 and a handle 44 having a length of about eight feet have been found to be particularly advantageous for flue walls of the previously mentioned dimensions, although various other area ratios and handle lengths could be utilized.

Figure 5:
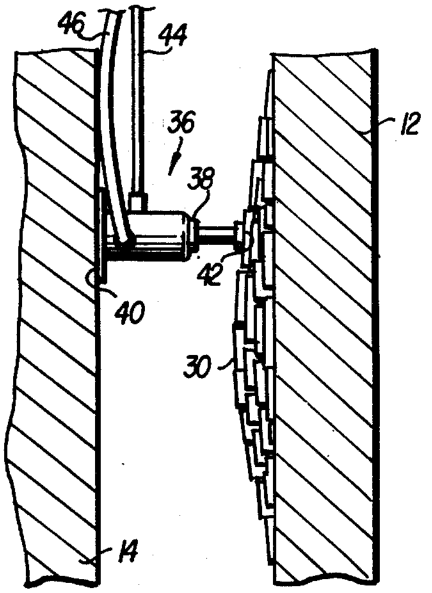
FIG. 5 is an end view of a collapsed wall portion of the flue walls taken along line 5—5 of FIG. 2 and showing the apparatus of FIG. 4 in position for straightening the collapsed wall portion.

In FIG. 5, the jack 36 is shown positioned for straightening the deformation zone 30 in accordance with the method of the invention which includes the steps of (1) inserting the jack 36 between the walls 12, 14 into a preselected position adjacent the deformation zone 30 with the smaller reaction surface 42 in confronting relation with a single brick of the deformation zone of wall 12 and the larger reaction surface 40 confronting at least two bricks of the opposing wall 14; (2) extending the jack 36 to engage the walls 12, 14 with the reaction surfaces 40, 42; (3) applying controlled, oppositely-directed forces to the bricks by operating the hydraulic pump to thereby reduce the deviation of the bricks 16 from the plane of the walls; and (4) retracting the jack from engagement with the walls. Since the greater force per unit area is applied at the single brick of the deformation zone, it will tend to move to a greater extent than the bricks of the confronting wall against which a lesser force per unit is applied. By successively moving the jack 36 into a number of predetermined positions about the deformation zone and repeating the aforementioned steps, reduction of the deformation zone can be readily accomplished.

Figure 6:
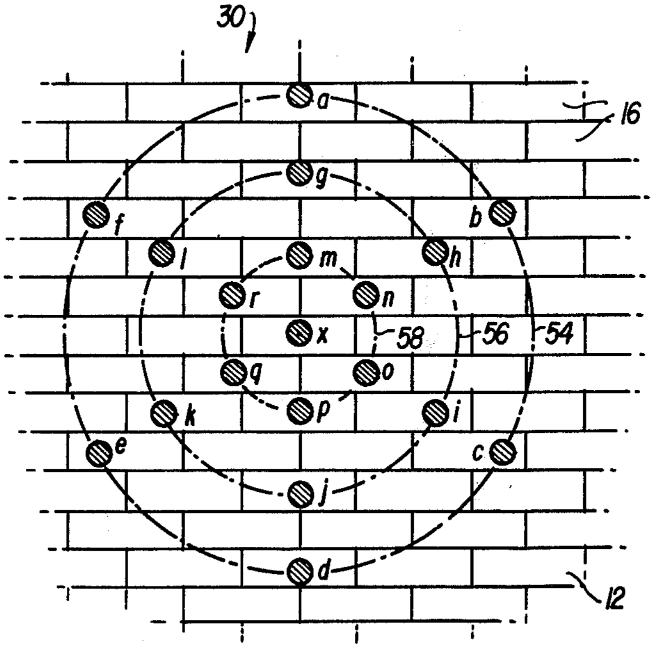
FIG. 6 is a partial side elevation view of the flue wall showing a circular pattern for positioning the jack reaction surfaces according to the wall-straightening method of the invention.

FIG. 6 illustrates an exemplary pattern of preselected positions about the deformation zone at which the jack may be advantageously located with a minimum danger of dislodging a brick from the wall. Preferably, the smaller reaction surface 42 is centrally located on the bricks at the successive positions *a–r* which are disposed along substantially circular paths 54, 56, 58 of diminishing radii about the center *x* of the deformation zone 30. As the jack is actuated at the successive positions *a–r*, the bricks adjacent an individual position will also be forced back into the plane of the wall by reason of the interlocking arrangement of the tongues and grooves on the upper and lower surfaces of the bricks. It is to be understood, however, that, depending upon the extent of the deformation zone, the jack need not necessarily be sequentially located at all the positions shown in FIG. 6. Some positions may be omitted and the jack may be moved in counterclockwise circular paths rather than clockwise paths as shown. It will be appreciated that the advantage of moving the jack from the periphery of the deformation zone toward the center thereof is that a lesser force is required to reduce the deformation zone than if the jack were initially located at the center of the zone at the point of maximum deviation.

Figure 3:
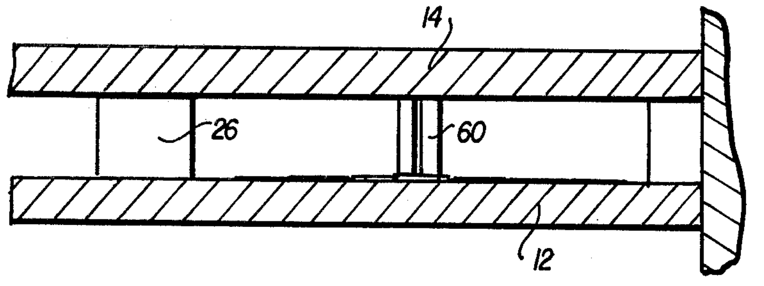
FIG. 3 is a broken cross-sectional view of the furnace flue taken along 2—2 of FIG. 1 showing the flue walls after they have been straightened utilizing the apparatus and method of the present invention.

After the deformation zone has been substantially completely reduced, the spacing between the walls 12, 14 adjacent the point of maximum wall deviation *x* is measured with the jack 36 still in its extended position. A tie brick 60 (FIG. 3) is then cut to a length equivalent to the spacing, inserted into position adjacent the jack 36 and, thereafter, the jack is retracted to permit the walls to move slightly inwardly and engage the end faces of the tie brick. Thus, as shown in FIG. 3, the deformation zone can be substantially eliminated and the only added resistance in the gas flow path is a single tie brick. If necessary, any gaps or cracks in the walls are pointed with a high temperature setting mortar to further strengthen the walls.

Although only preferred embodiments of the method of the present invention are specifically illustrated and described herein, it will be appreciated that many modifications and variations of the invention are possible in light of the above teachings and within the purview of the appended claims without departing from the spirit and intended scope of the invention.

We claim:

1. A method of straightening a deformation zone in one wall of a pair of spaced vertical walls formed of refractory brick, comprising the steps of:

- providing a jack means having oppositely disposed first and second reaction surfaces for applying oppositely directed forces;
- inserting the jack means between the walls into successive preselected positions in a substantially circular path about the deformation zone with the first and second reaction surfaces of the jack means in confronting relation with a respective one of the walls, said positions being selected so as to minimize the forces required to reduce the deformation zone;
- extending the jack means in each of said positions to cause engagement of the first and second reaction surfaces with the walls; and
- applying controlled, oppositely directed forces to the walls at each of said preselected positions by further extension of the jack means to thereby reduce the deformation zone.

2. The method according to claim 1 wherein said successive preselected positions are disposed along substantially circular paths of diminishing radii about the deformation zone.

3. The method according to claim 1 including the step of inserting a brace member between the walls adjacent the reduced deformation zone prior to retracting the jack means to provide support for the walls when the jack means is retracted.

4. The method according to claim 1 wherein the area of the first reaction surface is substantially greater than the area of the second reaction surface and including the step of orienting the jack means such that the second reaction surface is in confronting relation with the vertical wall having the deformation zone therein and the first reaction surface is in confronting relation with the other vertical wall.

5. The method according to claim 1 wherein the second reaction surface is positioned to confront a single one of the refractory bricks of the vertical wall having the deformation zone therein and the first reaction surface is positioned to confront at least two of the refractory bricks of the other vertical wall.

6. The method according to claim 1 wherein the spaced vertical walls comprise the flue walls of a carbon anode furnace and wherein the refractory bricks are interlocked with each other at least on the upper and lower surfaces thereof by tongues and grooves.

7. A method of straightening a deformation zone in one wall of a pair of spaced vertical walls formed of refractory brick, comprising the steps of:

- providing a jack means having oppositely disposed first and second reaction surfaces for applying oppositely directed forces, the area of the first reaction surface being greater than the area of said second reaction surface;
- inserting the jack means between the walls into a preselected position adjacent the deformation zone;
- orienting the jack means such that the second reaction surface is in confronting relation with a single one of the refractory bricks of the vertical walls having the deformation zone to be straightened and the first reaction surface is in confronting relation with at least two of the refractory bricks of the other vertical wall;
- extending the jack means to cause engagement of the first and second reaction surfaces with the walls; and
- applying controlled, oppositely directed forces to the walls at said preselected position by further extension of the jack means to thereby reduce the deformation zone.

8. The method according to claim 7 including the steps of locating the jack means in successive preselected positions about the deformation zone and extending and retracting the jack means into and out of engagement with the walls in each of said successive preselected positions to gradually reduce the deformation zone.

9. The method according to claim 8 wherein said successive preselected positions are disposed along substantially circular paths of diminishing radii about the deformation zone.

10. The method according to claim 7 including the step of inserting a brace member between the walls adjacent the reduced deformation zone prior to retracting the jack means to provide support for the walls when the jack means is retracted.

11. The method according to claim 7 wherein the spaced vertical walls comprise the flue walls of a carbon anode furnace and wherein the refractory bricks are interlocked with each other at least on the upper and lower surfaces thereof by tongues and grooves.

* * * * *